US012723876B2

(12) United States Patent
Suzuki et al.

(10) Patent No.: US 12,723,876 B2
(45) Date of Patent: Sep. 1, 2026

(54) INFORMATION PROCESSING DEVICE, INFORMATION PROCESSING METHOD, AND PROGRAM

(71) Applicant: NS Solutions Corporation, Tokyo (JP)

(72) Inventors: Hiroki Suzuki, Tokyo (JP); Takao Kakimori, Tokyo (JP)

(73) Assignee: NS Solutions Corporation, Tokyo (JP)

( * ) Notice: Subject to any disclaimer, the term of this patent is extended or adjusted under 35 U.S.C. 154(b) by 402 days.

(21) Appl. No.: 18/553,776

(22) PCT Filed: Apr. 19, 2021

(86) PCT No.: PCT/JP2021/015903
§ 371 (c)(1),
(2) Date: Oct. 3, 2023

(87) PCT Pub. No.: WO2022/224316
PCT Pub. Date: Oct. 27, 2022

(65) Prior Publication Data
US 2024/0183665 A1 Jun. 6, 2024

(51) Int. Cl.
*G01C 21/12* (2006.01)

(52) U.S. Cl.
CPC .................................... *G01C 21/12* (2013.01)

(58) Field of Classification Search
CPC ...... G01C 21/12; G01C 21/16; G01C 21/165; G01C 21/1656; G01C 21/26; G01C 21/28
See application file for complete search history.

(56) References Cited

U.S. PATENT DOCUMENTS

2010/0161224 A1* 6/2010 Lee ........................ G01C 21/12 701/300

FOREIGN PATENT DOCUMENTS

| | | | | |
|---|---|---|---|---|
| JP | H11230772 A * | 8/1999 | ............. G01C 21/00 |
| JP | 2014-025890 A | 2/2014 | |
| JP | 2020-183921 A | 11/2020 | |
| WO | WO-2019234936 A1 * | 12/2019 | ............. G01C 21/28 |
| WO | WO-2020/226103 A1 | 11/2020 | |

OTHER PUBLICATIONS

International Search Report and Written Opinion, issued by International Searching Authority in corresponding International Application No. PCT/JP2021/015903, on Jun. 29, 2021.

* cited by examiner

*Primary Examiner* — Benjamin R Schmitt
(74) *Attorney, Agent, or Firm* — ArentFox Schiff LLP

(57) ABSTRACT

Positioning in a more preferred aspect is ensured even under a situation where it is difficult to maintain a state where a wireless signal from a satellite is regularly receivable. An information processing device according to the present invention includes a first obtainer configured to obtain first information relating to an absolute position and posture in a real space of a predetermined housing, a second obtainer configured to sequentially obtain second information corresponding to a change in relative position of the housing in chronological order, and an estimator configured to estimate an absolute position in the real space of the housing at a time point at which the change in relative position of the housing indicated by the second information has been detected with the absolute position and posture of the housing corresponding to the first information as a reference.

7 Claims, 10 Drawing Sheets

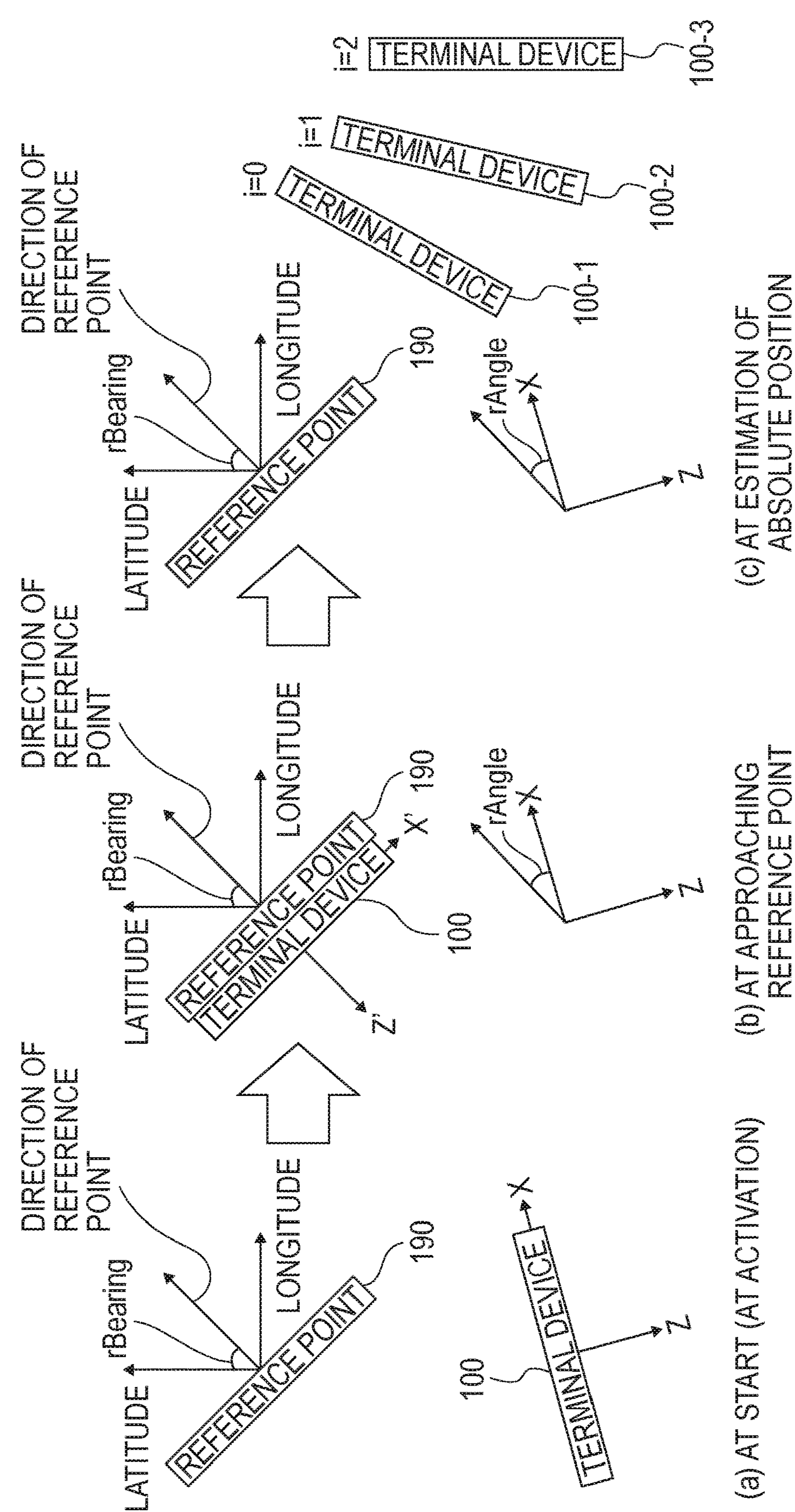
FIG.5
LATITUDE
LONGITUDE
rBearing
DIRECTION OF REFERENCE POINT
REFERENCE POINT
190
TERMINAL DEVICE
100
X
Z
(a) AT START (AT ACTIVATION)
LATITUDE
LONGITUDE
rBearing
DIRECTION OF REFERENCE POINT
REFERENCE POINT
TERMINAL DEVICE
190
100
X'
Z'
rAngle
X
Z
(b) AT APPROACHING REFERENCE POINT
LATITUDE
LONGITUDE
rBearing
DIRECTION OF REFERENCE POINT
REFERENCE POINT
190
rAngle
X
Z
i=0
TERMINAL DEVICE
100-1
i=1
TERMINAL DEVICE
100-2
i=2
TERMINAL DEVICE
100-3
(c) AT ESTIMATION OF ABSOLUTE POSITION FIG.7
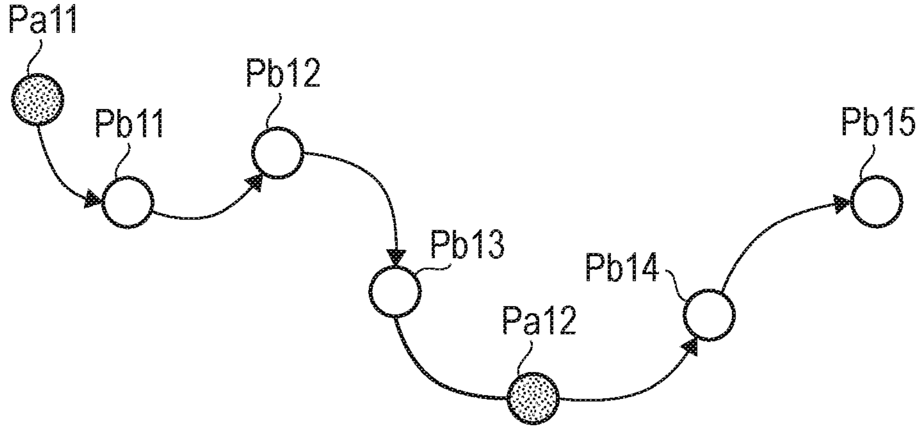
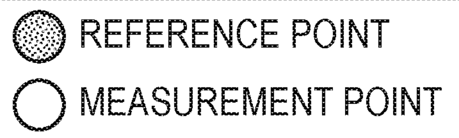

INFORMATION PROCESSING DEVICE, INFORMATION PROCESSING METHOD, AND PROGRAM

CROSS-REFERENCE TO RELATED APPLICATIONS

The present Application for Patent is a National Stage Entry of International Application No. PCT/JP2021/015903, filed Apr. 19, 2021. The disclosure of the priority documents are incorporated in its entirety by reference herein.

TECHNICAL FIELD

The present disclosure relates to an information processing device, an information processing method, and a program.

BACKGROUND ART

In recent years, the technique referred to as Global Navigation Satellite System (GNSS) typified by the Global Positioning System (GPS) is used to achieve a practical application of a mechanism that ensures positioning of a moving body. In the positioning by the GPS, a wireless signal transmitted from a satellite is received by a terminal device, and a distance between the satellite and the terminal device is calculated by using a time difference between a time point at which the wireless signal is transmitted and a time point at which the wireless signal is received, and thus, the position of the terminal device is estimated. For example, Patent Literature 1 discloses one example of a technique relating to the estimation of a position of a moving body using the GPS.

CITATION LIST

Patent Literature

Patent Literature 1: Japanese Laid-open Patent Publication No. 2014-25890

SUMMARY OF INVENTION

Technical Problem

Meanwhile, under a situation where positioning of a moving body is performed by using a wireless signal transmitted from a satellite, such as the GNSS, in an environment of being covered with a shield, such as a roof and a wall surface, for example, in indoors and in underground facilities, highly accurate positioning is difficult in in some cases due to the wireless signal being blocked by the shield.

In view of the above-described problem, an object of the present invention is to ensure positioning in a more preferred aspect even under a situation where it is difficult to maintain a state where a wireless signal from a satellite is regularly receivable.

Solution to Problem

An information processing device according to the present invention includes: a first obtainer configured to obtain first information relating to an absolute position and posture in a real space of a predetermined housing; a second obtainer configured to sequentially obtain second information corresponding to a change in relative position of the housing in chronological order; and an estimator configured to estimate the absolute position in the real space of the housing at a time point at which the change in relative position of the housing indicated by the second information has been detected with the absolute position and posture of the housing corresponding to the first information as a reference.

Advantageous Effects of Invention

With the present invention, positioning in a more preferred aspect is ensured even under a situation where it is difficult to maintain a state where a wireless signal from a satellite is regularly receivable.

BRIEF DESCRIPTION OF DRAWINGS

FIG. 5 is an explanatory view regarding an estimating method of the absolute position of the housing.

FIG. 7 is an explanatory view regarding a determination of a reference point used for deriving absolute coordinates.

DESCRIPTION OF EMBODIMENTS

Figure 1:
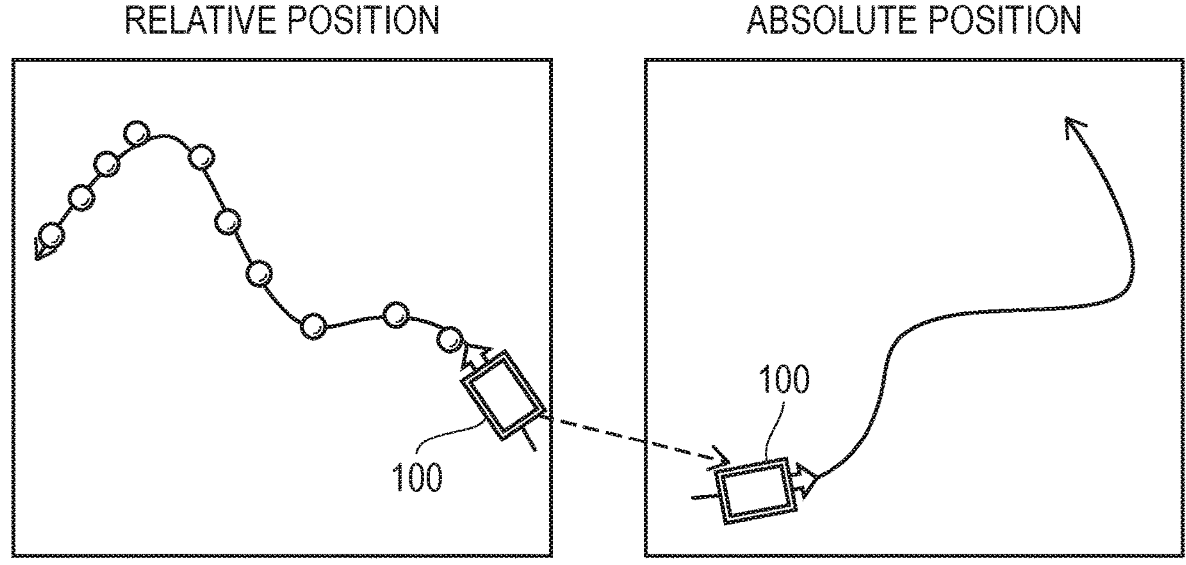
FIG. 1 is a drawing for describing an outline of a technique relating to positioning.

The following describes a preferred embodiment of the present disclosure in detail with reference to the attached drawings. Note that configuration members having the substantially identical function compositions do not have repeated explanations by attaching the identical reference numerals in the description and the drawings.

Outline

First, with reference to FIG. 1, an outline of a technique relating to positioning by an information processing device according to the embodiment will be described. A terminal device 100 according to the embodiment is configured to be carriable by a user, like what is called a smartphone and a tablet terminal. Under such a premise, the terminal device 100 uses, for example, various kinds of sensors and an image capturing unit supported by a housing to detect relative changes in position of the housing (in other words, position of the terminal device 100 itself).

As one specific example, the terminal device 100 may extract feature points of an object and a background captured as a photographic subject from respective images obtained sequentially according to imaging results by the image capturing unit supported by the housing and track the photographic subject based on the extraction results of the feature points. Thus, the terminal device 100 can calculate changes in relative position and posture of the housing with the photographic subject corresponding to the extracted feature points as a reference.

As another example, the terminal device 100 may calculate the changes in relative position and posture of the housing based on detection results of an acceleration sensor, an angular rate sensor, and the like supported by the housing.

The descriptions above are obviously only examples, and a method and a configuration for achieving the method are not particularly limited as long as the terminal device 100 can derive the changes in relative position and posture of the housing. For example, the terminal device 100 may sequentially calculate a distance between an object in a real space and the housing in chronological order by using a distance measuring sensor supported by the housing. Thus, the terminal device 100 can calculate the changes in relative position and posture of the housing with the object as a calculation target of the distance as a reference by using the calculation results of the distances.

As described above, the terminal device 100 sequentially calculates at least the changes in relative position of the housing in chronological order. The terminal device 100 then traces the changes in relative position of the housing (in other words, a movement path) in chronological order to estimate a position of the housing in a local coordinate system internally controlled by the terminal device 100.

Meanwhile, the local coordinate system internally controlled by the terminal device 100 does not necessarily have an axis corresponding to that of a coordinate system that is absolute (hereinafter also referred to as an "absolute coordinate system") in the real space. Even if the local coordinate system corresponds to the absolute coordinate system, it is difficult for the terminal device 100 to recognize the correspondence between these coordinate systems only with information in the local coordinate system.

Therefore, the terminal device 100 estimates an absolute position and posture of the housing at least one position on a path relating to the movement, and, by using the estimation result, converts the position of the housing in the local coordinate system (the relative position) into a position in the absolute coordinate system (the absolute position) also for other positions. Note that in the following description, the above-described position at which the estimation of the absolute position and posture of the housing is performed is also referred to as a "reference point" for convenience.

Specifically, the terminal device 100 converts the position of the housing in the local coordinate system (the relative position) into the position in the absolute coordinate system (the absolute position) for other points (in other words, other positions) other than the reference point on the path relating to the movement with the absolute position and posture of the housing at the reference point as a reference. The application of such control ensures estimating the absolute position of the housing even under a situation where it is difficult to maintain a state where a wireless signal from a satellite relating to positioning is regularly receivable, like in an environment of being covered with a shield, such as a roof and a wall surface (e.g., in indoors and in underground facilities).

Therefore, the following will describe technical features of the terminal device 100 according to the embodiment in more detail by focusing especially on a process relating to an estimation of an absolute position of a predetermined housing (e.g., the housing of the terminal device 100).

<Hardware Configuration>

Figure 2:
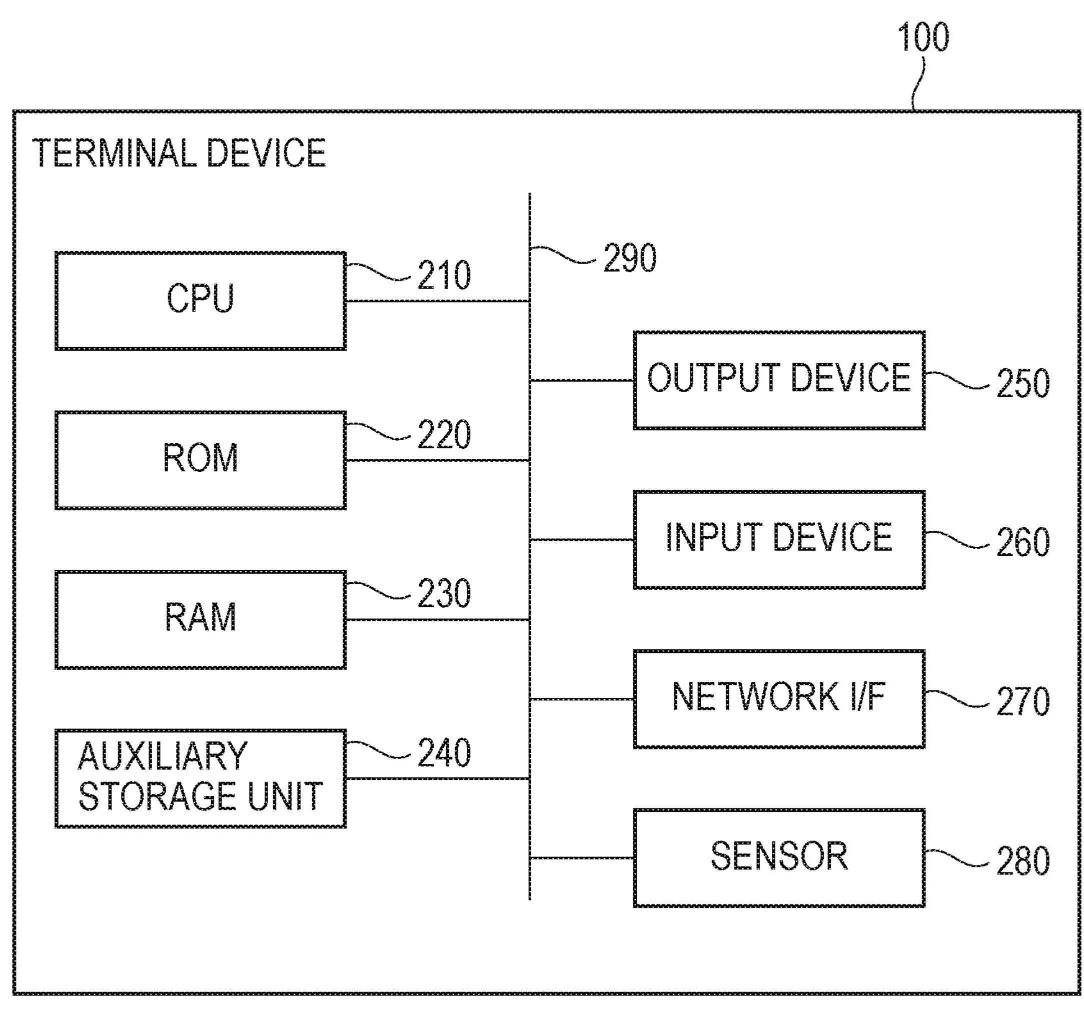
FIG. 2 is a drawing illustrating one example of a hardware configuration of a terminal device.

With reference to FIG. 2, one example of a hardware configuration of the terminal device 100 according to the embodiment will be described. As illustrated in FIG. 2, the terminal device 100 according to the embodiment includes a Central Processing Unit (CPU) 210, a Read Only Memory (ROM) 220, and a Random Access Memory (RAM) 230. The terminal device 100 includes an auxiliary storage unit 240, an output device 250, an input device 260, a network I/F 270, and a sensor 280. The CPU 210, the ROM 220, the RAM 230, the auxiliary storage unit 240, the output device 250, the input device 260, the network I/F 270, and the sensor 280 are mutually coupled via a bus 290.

The CPU 210 is a central processing unit that controls various kinds of operations of the terminal device 100. For example, the CPU 210 may control operations of the whole terminal device 100. The ROM 220 stores a control program, a boot program, and the like executable by the CPU 210. The RAM 230 is a main storage memory of the CPU 210 and is used as a temporary storage area for deploying a work area or various kinds of programs.

The auxiliary storage unit 240 stores various kinds of data and various kinds of programs. The auxiliary storage unit 240 is achieved by a storage device that can temporarily or sustainably store the various kinds of data, such as a non-volatile memory typified by a Hard Disk Drive (HDD) and a Solid State Drive (SSD).

The output device 250 is a device that outputs various kinds of information and is used to present the various kinds of information to a user. In the embodiment, the output device 250 is achieved by a display device, such as a display. The output device 250 displays various kinds of display information to present the information to the user. The output device 250, however, may be achieved by an acoustic output device that outputs a sound, such as a voice and an electronic sound, as another example. In this case, the output device 250 presents the information to the user by outputting the sound, such as the voice and an electronic sound. A device applied as the output device 250 may be changed as appropriate according to a medium used for presenting the information to the user. Note that the output device 250 corresponds to one example of an "output unit" used to present the various kinds of information.

The input device 260 is used to receive various kinds of instructions from the user. In the embodiment, the input device 260 includes an input device, such as a mouse, a keyboard, and a touchscreen. The input device 260, however, may include a sound collecting device, such as a microphone, to collect a voice spoken by the user as another example. In this case, the collected voice is subjected to various kinds of analysis processes, such as an acoustic analysis and a natural language process, and thus, the content indicated by this voice is recognized as an instruction from the user. A device applied as the input device 260 may be changed as appropriate according to a method of recognizing the instruction from the user. A plurality of kinds of devices may be applied as the input device 260.

The network I/F 270 is used for communication with an external device through a network. Note that a device applied as the network I/F 270 may be changed as appropriate according to a type of communication path and an applied communication method.

The sensor 280 detects various kinds of states of the terminal device 100. The terminal device 100 according to the embodiment includes a sensor that can detect the changes in position and posture of the terminal device 100 itself (in other words, the housing of the terminal device 100), such as an acceleration sensor and an angular rate sensor, as the sensor 280. The sensor 280 outputs information corresponding to the detection result of the various kinds of states to the CPU 210.

Figure 8:
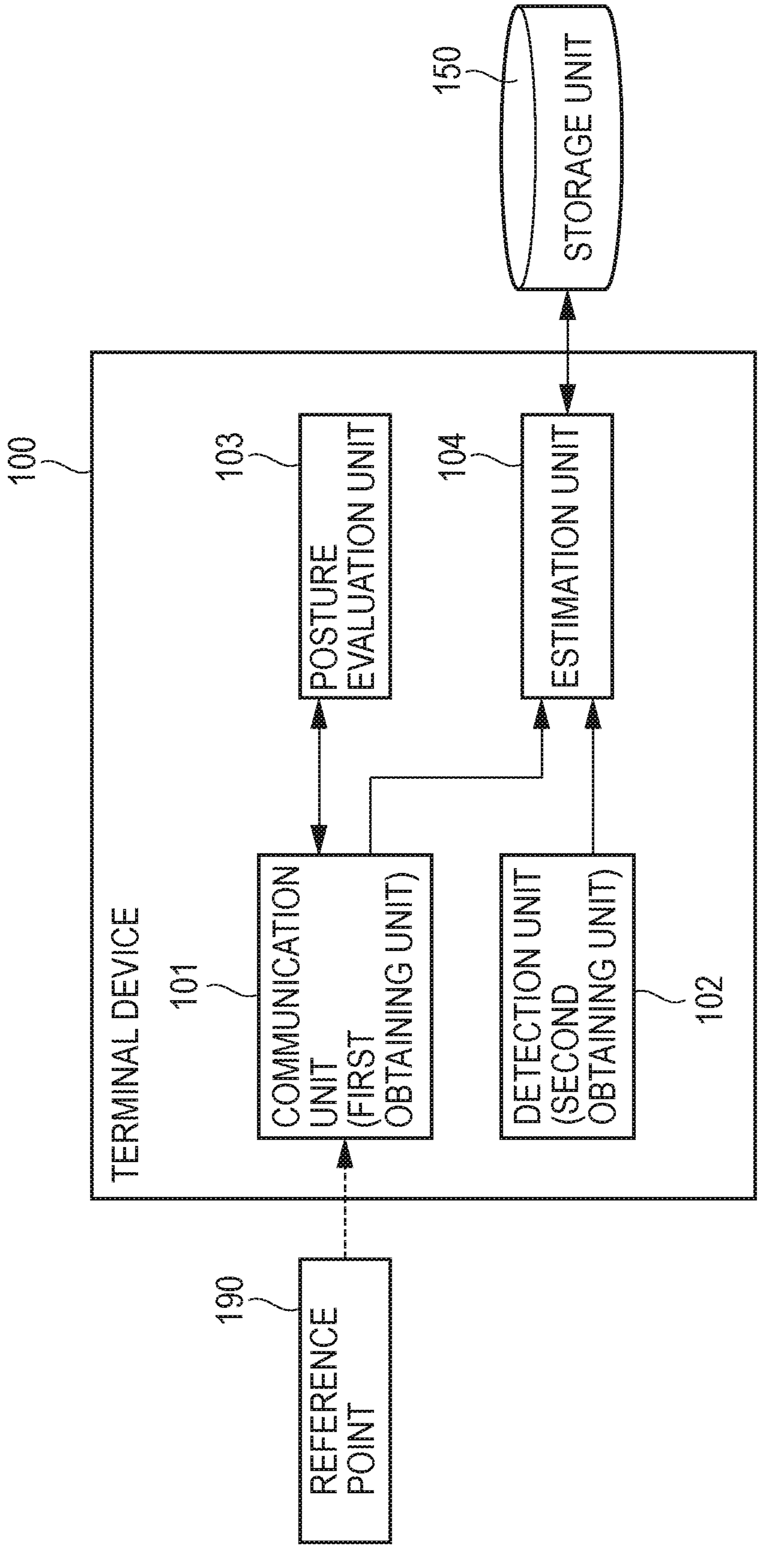
FIG. 8 is a block diagram illustrating one example of a function composition of the terminal device.
Figure 9:
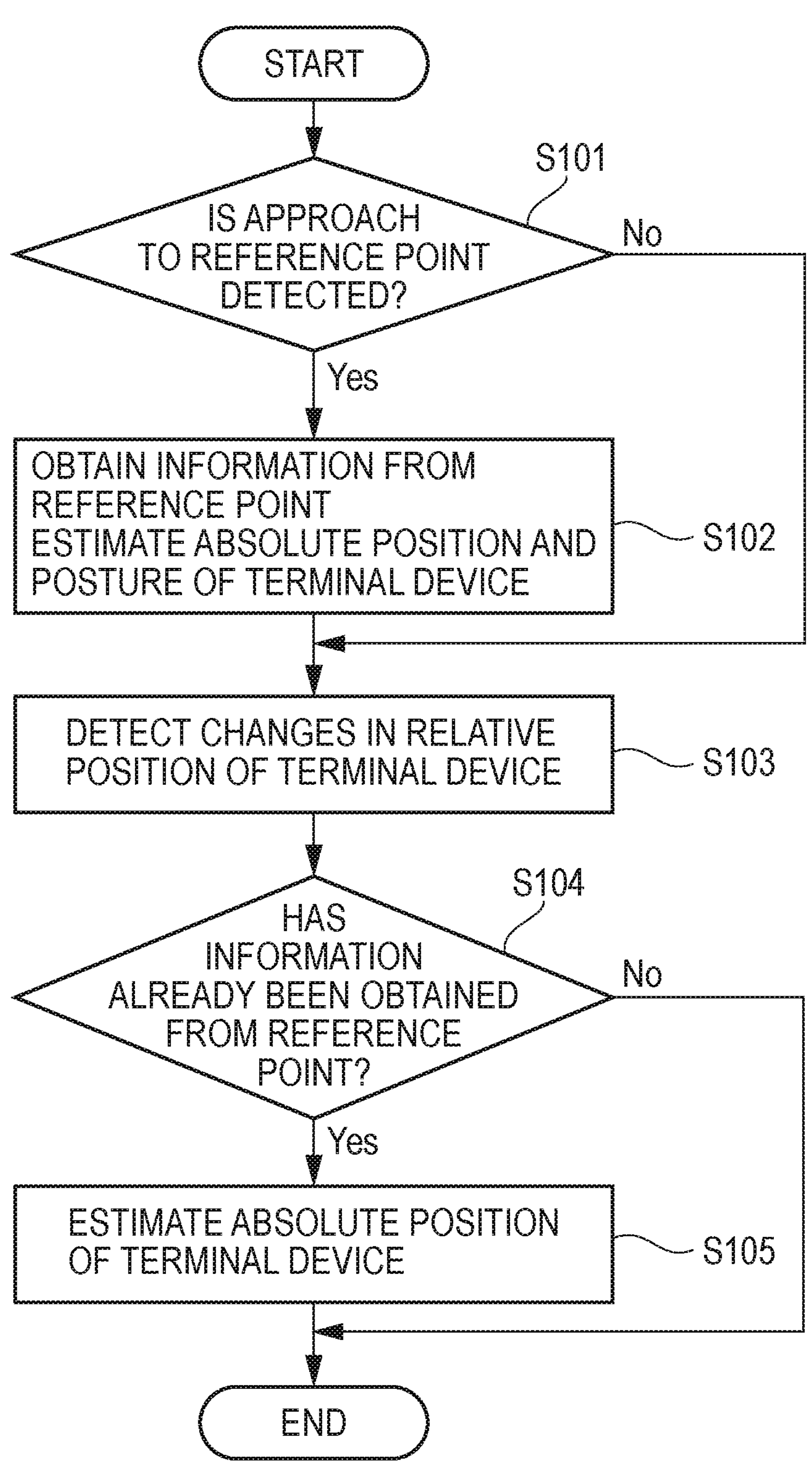
FIG. 9 is a flowchart illustrating one example of a process of the terminal device.

The CPU 210 deploys the program stored in the ROM 220 or the auxiliary storage unit 240 to the RAM 230 and executes this program, and thus, a function composition of the terminal device 100 illustrated in FIG. 8 and a process shown by the flowchart illustrated in FIG. 9 are achieved.

Technical Idea

With reference to FIG. 3 to FIG. 7, the following describes one example of a technical idea for the terminal device 100 according to the embodiment to achieve the estimation of the absolute position of the predetermined housing whose outline has been described with reference to FIG. 1.

First, with reference to FIG. 3, one example of the local coordinate system internally controlled by the terminal device 100 will be described. Note that in the following, for convenience, a terminal device configured to be carriable, like what is called a smartphone and a tablet terminal, is applied as the terminal device 100, and the terminal device 100 estimates the absolute position of its own housing.

Figure 3:
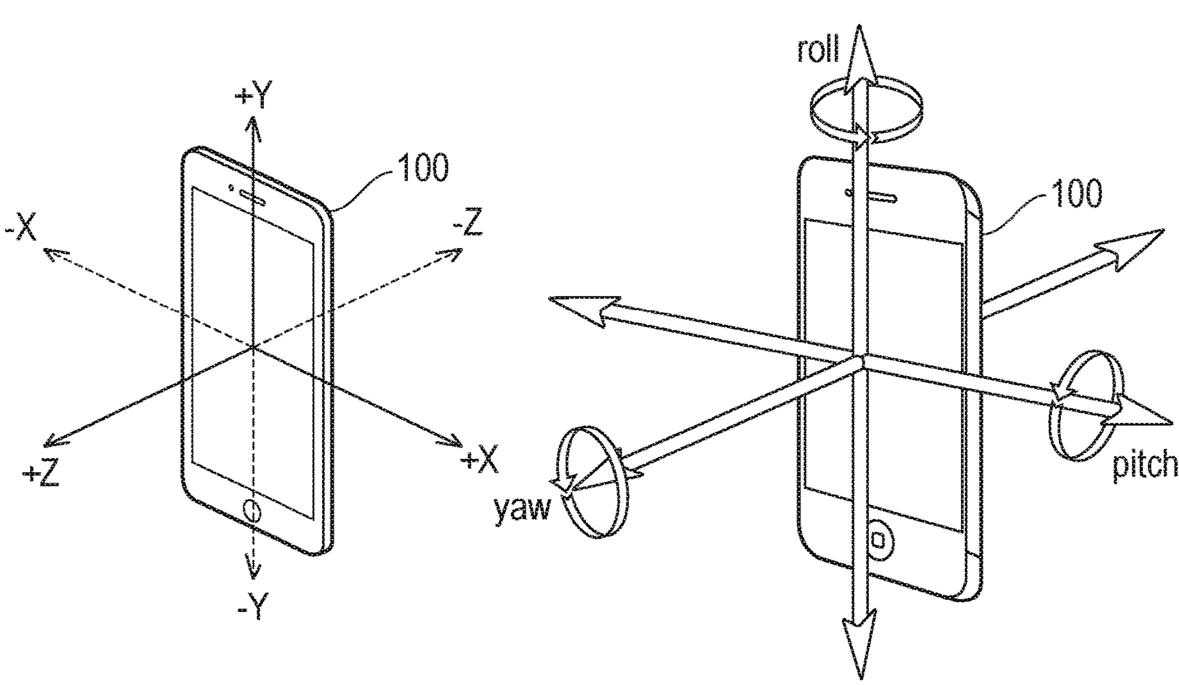
FIG. 3 is an explanatory view regarding a local coordinate system.

As illustrated in a left drawing in FIG. 3, the terminal device 100 includes the housing in a plate shape with an approximately square-shaped surface having a long direction and a short direction, and specifies the local coordinate system based on the respective directions with the housing at a desired time point (e.g., at activation) as a reference. Specifically, in the example illustrated in FIG. 3, the terminal device 100 specifies the local coordinate system with the short direction of the above-described surface as an "X-direction," the long direction of the surface as a "Y-direction," and a direction perpendicular to the surface as a "Z-direction."

One surface in the Z-direction is provided with a screen for displaying the various kinds of information. Therefore, in the Z-direction, a direction on a side of the surface provided with the screen (also referred to as a "front surface") is also referred to as a "+Z-direction," and a direction of a surface on the opposite side of the above-described surface (also referred to as a "back surface") is also referred to as a "−Z-direction"). In a state where the long direction (the Y-direction) of the above-described screen approximately corresponds to a vertical direction in the real space and a top and bottom direction of the screen approximately corresponds to a top and bottom direction of the vertical direction, a direction corresponding to an upper side in the vertical direction is referred to as a "+Y-direction," and a direction corresponding to a lower side is referred to as a "−Y-direction." In this state, a direction corresponding to a left direction when opposed to the screen is referred to as a "−X-direction," and a direction corresponding to a right side is referred to as a "+X-direction." That is, the coordinate system illustrated in the left drawing in FIG. 3 can be said to be a coordinate system indicating the position of the housing of the terminal device 100.

A right drawing in FIG. 3 specifies a rotation direction in the local coordinate system internally controlled by the terminal device 100. Specifically, a rotational direction with the Y-direction as an axis is also referred to as a "roll direction," in which a counterclockwise direction viewed from a +Y-direction side is a "positive" direction and a clockwise direction is a "negative" direction. A rotational direction with the X-direction as an axis is also referred to as a "pitch direction," in which a counterclockwise direction viewed from a +X-direction side is a "positive" direction and a clockwise direction is a "negative" direction. A rotational direction with the Z-direction as an axis is also referred to as a "yaw direction," in which a counterclockwise direction viewed from a +Z-direction side is a "positive" direction and a clockwise direction is a "negative" direction. That is, the rotating coordinate system illustrated in the right drawing in FIG. 3 can also be said to be a coordinate system indicating the posture of the housing (in other words, a direction of the housing) of the terminal device 100.

Note that in the following description, when it is simply described as the "local coordinate system," it indicates the local coordinate system internally controlled by the terminal device 100 unless otherwise described. In the following description, a coordinate that indicates the position in the local coordinate system (that is, the relative position) is also referred to as a "local coordinate," and in contrast to this, a coordinate that indicates the position in the absolute coordinate system (that is, the absolute position) is also referred to as an "absolute coordinate."

Next, with reference to FIG. 4, one example of a mechanism for the terminal device 100 to be able to estimate the absolute position and posture of its own housing at the reference point will be described. In the embodiment, the terminal device 100, in a state of being close to a reference point 190 disposed at a desired position in the real space, obtains information relating to an absolute position and posture of the reference point 190 from the reference point 190 and estimates the absolute position and posture of its own housing based on the information.

Specifically, the reference point 190 includes a communication device for performing what is called contactless communication typified by Near Field Communication (NFC). Based on that, when the terminal device 100 approaches (in other words, when the housing of the terminal device 100 approaches) a surface on which wireless signals are transmitted and received (hereinafter also referred to as a "communication surface"), the reference point 190 transmits information relating to the absolute position and posture of the communication surface to the terminal device 100 by the contactless communication. Based on that, the terminal device 100 estimates the absolute position and posture of its own housing based on the above-described information transmitted from the reference point 190 as a result of approaching the communication surface of the reference point 190. Note that in the following description, for convenience, the terminal device 100 approaching the communication surface of the reference point 190 is also simply referred to as "the terminal device 100 approaching the reference point 190." The absolute position and posture of the communication surface of the reference point 190 is also simply referred to as "the absolute position and posture of the reference point 190."

Note that if a distance that allows the contactless communication is a distance acceptable as an error when the absolute position is estimated, it can be regarded that the terminal device 100 and the reference point 190 have the absolute positions approximately corresponding to one another when the terminal device 100 is close to the reference point 190. In other words, the terminal device 100 being close to the reference point 190 in the present disclosure can also be said that a distance between the terminal device 100 and the reference point 190 is in a state within a range acceptable as an error when the absolute position is estimated, and can also be said that the distance is in a state within a range in which the contactless communication is allowed.

In a state where the terminal device 100 is in a relatively predetermined posture and is close to the reference point 190, control may be performed such that the above-described information is transmitted from the reference point 190 to the terminal device 100 based on the contactless communication. Thus, the terminal device 100 recognizes the absolute posture of the reference point 190 based on the information transmitted from the reference point 190, and thus, can estimate the absolute posture of its own housing based on the recognition result.

Figure 4:
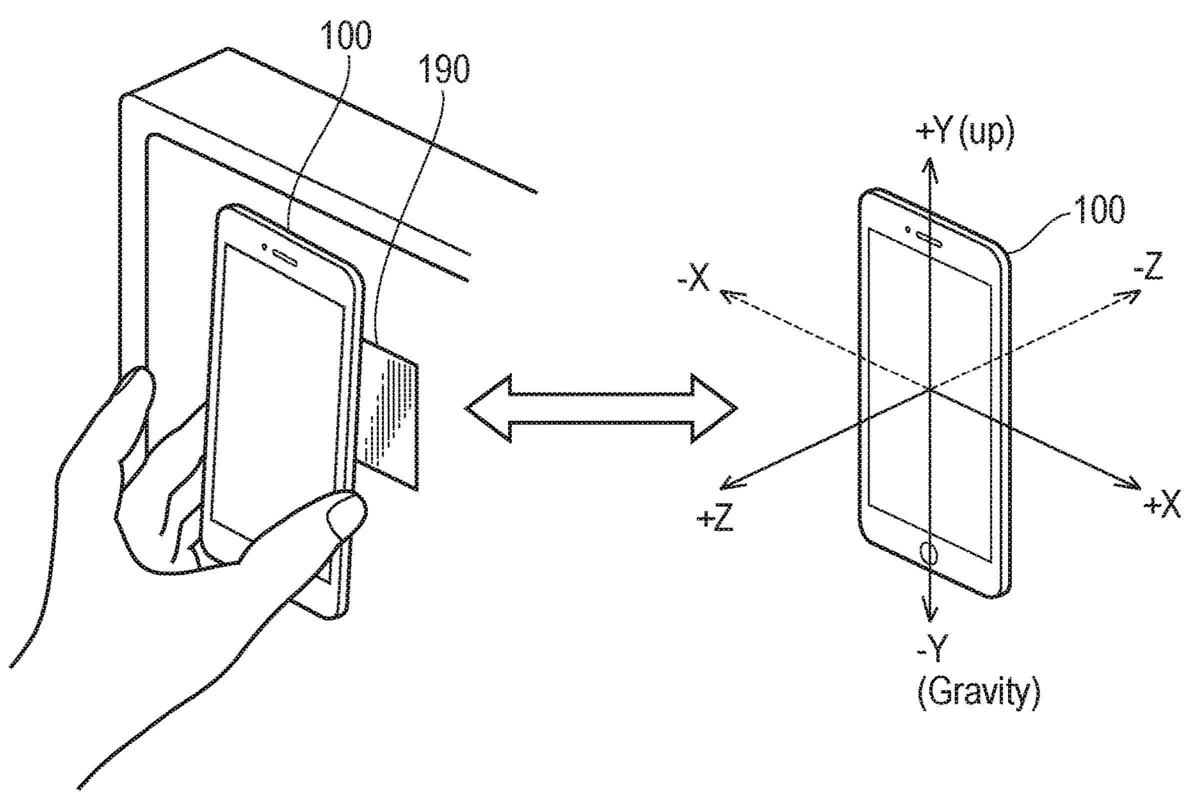
FIG. 4 is an explanatory view regarding an estimation of an absolute position and posture of a housing.

As one specific example, in the example illustrated in FIG. 4, the reference point 190 has the communication surface disposed such that one of the directions in which the communication surface extends approximately correspond to the vertical direction of the real space (in other words, a direction of a gravitational acceleration rate). Based on that, in a state where the terminal device 100 is close to the reference point 190 in a state where the −Y-direction of the terminal device 100 approximately corresponds to the direction of the gravitational acceleration rate, it is only necessary that the above-described information is transmitted from the reference point 190 to the terminal device 100 based on the contactless communication. Thus, the posture of the terminal device 100 close to the reference point 190 can be matched to the absolute posture of the reference point 190.

Note that one example will be additionally described later for a mechanism for controlling such that the above-described information is transmitted from the reference point 190 to the terminal device 100 in the state where the terminal device 100 is in the relatively predetermined posture and is close to the reference point 190.

Figure 6:
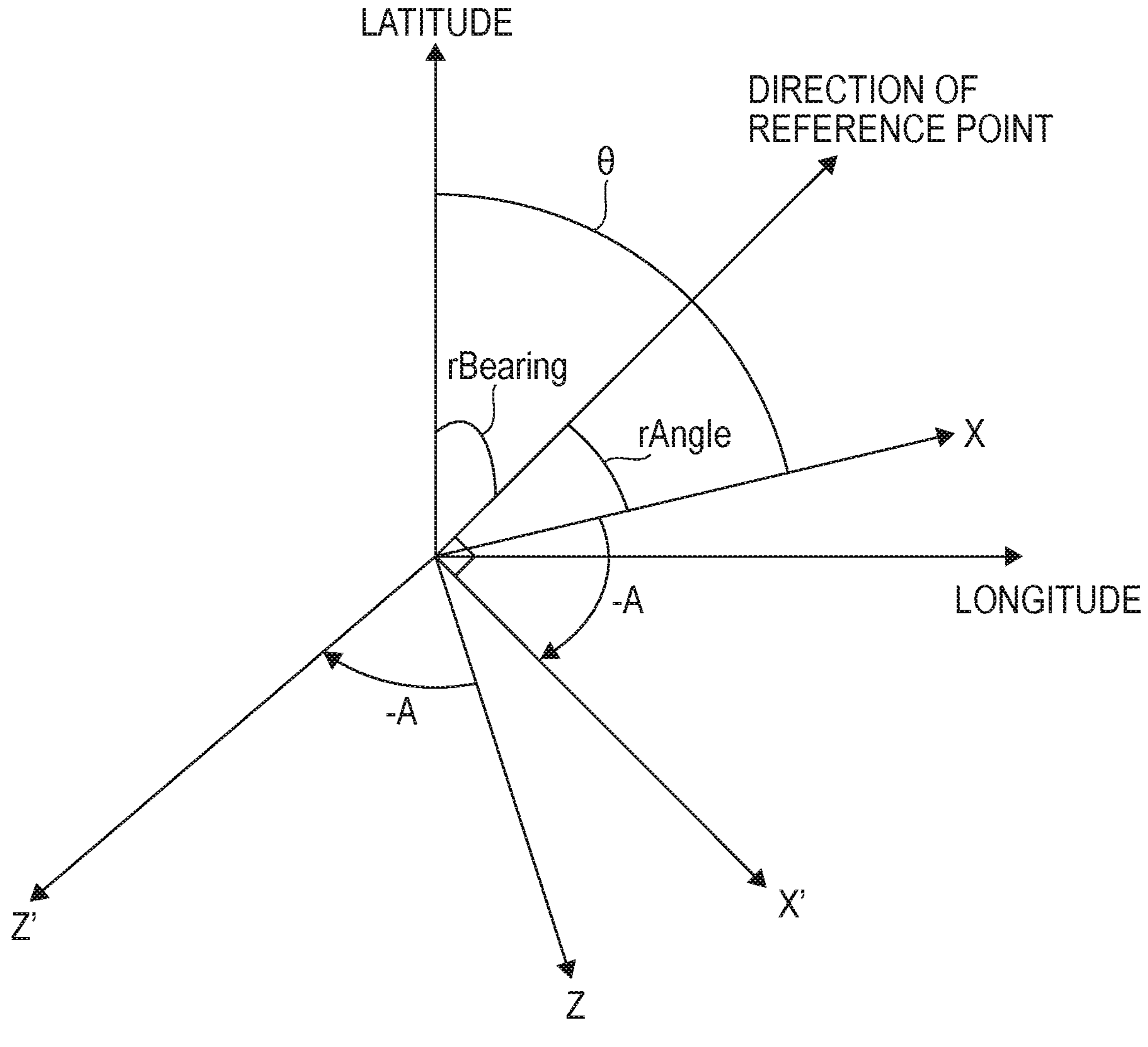
FIG. 6 is an explanatory view regarding the estimating method of the absolute position of the housing.

Next, with reference to FIG. 5 and FIG. 6, the following describes one example of a method for estimating the absolute position of the housing of the terminal device 100 at another position on the path relating to the movement based on the information obtained from the reference point 190 as a result of the terminal device 100 approaching the reference point 190. In other words, the following describes a method for estimating the absolute position of the terminal device 100 at another time point different from a time point at which the terminal device 100 has approached the reference point 190 based on the information obtained from the reference point 190.

Note that in the example where the description is made with reference to FIG. 5 and FIG. 6, with an X-axis, a Z-axis, and a Y-axis in the local coordinate system being matched to the latitude, the longitude, and the vertical direction in the absolute coordinate system, respectively, the estimation of the absolute position of the terminal device 100 is performed based on a displacement between the local coordinate system and the absolute coordinate system.

First, as illustrated as FIG. 5(*a*), the terminal device 100 specifies the local coordinate system (that is, the X-direction, the Y-direction, and the Z-direction) based on the position and the posture of its own housing at a desired time point (e.g., at the activation).

For example, the terminal device 100 detects a gravitational acceleration rate by using, for example, an acceleration sensor, and thus, can also specify the local coordinate system based on the direction of the gravitational acceleration rate. In this case, it is only necessary that the terminal device 100 specifies the X-direction and the Z-direction according to the posture of its own housing on a surface intersecting with the Y-direction at right angles with the direction of the gravitational acceleration rate being specified as the −Y-direction.

Note that in the example illustrated in FIG. 5, for a brief description, the Y-direction corresponds to the vertical direction in the real space (the direction of the gravitational acceleration rate) at the above-described predetermined time point, and based on that, the X-direction and the Z-direction are specified according to the posture of the housing of the terminal device 100. In the example illustrated in FIG. 5(*a*), the X-direction and the Z-direction in the local coordinate system have displacements in the roll direction with the Y-direction as an axis with respect to the latitude and the longitude in the absolute coordinate system.

Next, as illustrated in FIG. 5(*b*), the terminal device 100 has approached the reference point 190. A direction corresponding to the posture of the terminal device 100 on an XZ plane is also referred to as an "X'-direction" and a "Z'-direction" for convenience.

Specifically, a +X'-direction indicates a direction in which a direction corresponding to the +X-direction of the housing of the terminal device 100 in the state illustrated in FIG. 5(*a*) is directed in the state illustrated in FIG. 5(*b*). Similarly, a +Z'-direction indicates a direction in which a direction corresponding to the +Z-direction of the housing of the terminal device 100 in the state illustrated in FIG. 5(*a*) is directed in the state illustrated in FIG. 5(*b*). That is, the +Z'-direction and the +X'-direction intersect at right angles on the XZ plane of the local coordinate system (in other words, on a horizontal surface of the absolute coordinate system). Note that in the present disclosure, the horizontal surface in the absolute coordinate system indicates a plane extending in a latitude direction and a longitude direction.

When a direction on the opposite side of a direction in which the terminal device 100 approaches among directions perpendicular to the communication surface of the reference point 190 is a "direction of the reference point," a direction on the opposite side of the direction of the reference point approximately corresponds to the +Z'-direction.

On the horizontal surface of the absolute coordinate system (in other words, on the XZ plane of the local coordinate system), an angle between the direction of the reference point and the latitude direction is rBearing. That is, the angle rBearing indicates the posture of the reference point 190 on the horizontal surface of the absolute coordinate system.

As illustrated in FIG. 5(*b*), an angle corresponding to a rotation amount on the XZ plane of the local coordinate system (that is, a rotation amount in the roll direction) of the terminal device 100 close to the reference point 190 is rAngle.

Based on that, in the state illustrated in FIG. 5(*b*), the terminal device 100 estimates the absolute position and posture of its own housing based on the information relating to the absolute position and posture of the reference point 190 obtained from the reference point 190. Here, with reference to FIG. 6, one example of the method for estimating the absolute position and posture of the housing of the terminal device 100 in the state illustrated in FIG. 5(*b*) will be described.

In FIG. 6, an angle A indicates an angle corresponding to the changes in posture of the housing of the terminal device 100 on the XZ plane of the local coordinate system (in other words, on the horizontal surface of the absolute coordinate system) that has been changed between the state illustrated in FIG. 5(*a*) and the state illustrated in FIG. 5(*b*). In other words, the angle A can be said to represent the changes in posture of the housing of the terminal device 100 in the roll direction.

In this case, the angle rAngle is represented by the relational expression shown as (Formula 1) below based on the above-described angle A. Note that as described above with reference to FIG. 3, the counterclockwise direction is the positive direction of the roll direction.

[Math. 1]

$$rAngle=\pi/2+(-A) \quad \text{(Formula 1)}$$

Here, the reference is made to FIG. 5 again. FIG. 5(*c*) schematically illustrates a state where the absolute position of the terminal device 100 at another time point is estimated by using the estimation result of the absolute position and posture of the terminal device 100 in the state where the terminal device 100 is close to the reference point 190.

In FIGS. 5(*c*), 100-1, 100-2, and 100-3 schematically illustrates the position and posture of the terminal device 100 at other time points i=0, i=1, and i=2 after the time point at which the terminal device 100 has approached the reference point 190. The time point i indicates a time point at which a measurement (the estimation) of the position of the terminal device 100 in the local coordinate system is performed (e.g., a time point at which the changes in relative position of the terminal device 100 is detected). Note that in the following description, the position at the time point at which the measurement (the estimation) of the position of the terminal device 100 in the local coordinate system is performed among the respective positions on the path relating to the movement of the terminal device 100 is also referred to as a "measurement point."

Here, local coordinates of the housing of the terminal device 100 positioned at the measurement point at the time point i are expressed by (xi, yi, zi). Local coordinates of the reference point 190 are expressed by (rx, ry, rz), and absolute coordinates of the reference point 190 are expressed by (rLat, rAlt, rLng). Amounts of changes in latitude and longitude per meter in a peripheral area of the absolute coordinates of the reference point 190 are expressed by dLat and dLng, respectively.

Based on the above, when the displacement between the absolute coordinate system and the local coordinate system on the horizontal surface on the premise that the Y-direction approximately corresponds to the vertical direction is expressed by an angle θ as illustrated in FIG. 6, the angle θ is represented by the relational expression shown as (Formula 2) below. When absolute coordinates of the housing of the terminal device 100 positioned at the measurement point at the time point i is expressed by (Lati, Lngi, Alti), Lati, Lngi, and Alti are represented by the respective relational expressions shown as (Formula 3) to (Formula 5) below.

[Math. 2]

$$\begin{aligned}\theta &= rBearing + rAngle \\ &= rBearing + \pi/2 + (-A)\end{aligned} \quad \text{(Formula 2)}$$

$$Lati = rLat + dLat*((xi-rx)*\cos\theta-(zi-rz)*\sin\theta) \quad \text{(Formula 3)}$$

$$Lngi = rLng + dLng*((xi-rx)*\sin\theta+(zi-rz)*\cos\theta) \quad \text{(Formula 4)}$$

$$Alti = rAlt + (yi-ry) \quad \text{(Formula 5)}$$

As described above, conversion formulae to convert the local coordinates into the absolute coordinates using the local coordinates (xi, yi, zi) at the measurement point as variables, shown as (Formula 3) to (Formula 5) described above, are derived.

That is, when the absolute coordinates of the terminal device 100 are estimated, the local coordinates (xi, yi, zi) measured (estimated) for the respective measurement points are input to the conversion formulae shown as (Formula 3) to (Formula 5) described above, thereby enabling the derivation (the estimation) of the absolute coordinates (Lati, Lngi, Alti) of the housing of the terminal device 100 at the measurement point.

Note that the reference point is not limited to one place only but may be disposed at a plurality of places. In such a case, the reference points used to derive the absolute coordinates may be determined according to a relation between the measurement point as a derivation target of the absolute coordinates and the respective reference points that the terminal device 100 has approached. As one specific example, among a series of reference points that the terminal device 100 has approached, the reference point to which the approach has been performed at a time point closer to a time point at which the terminal device 100 is positioned at the target measurement point (in other words, a time point at which the changes in relative position have been detected) may be used to derive absolute coordinates of the measurement point.

For example, FIG. 7 is an explanatory view for describing a process relating to a determination of the reference point used to derive the absolute coordinates of the measurement point. In FIG. 7, Pa11 and Pa12 schematically indicate reference points that the terminal device 100 has approached (that is, the reference points used to estimate the absolute position and posture of the terminal device 100) on the movement path of the terminal device 100. Pb11 to Pb15 each schematically indicate measurement points on the movement path of the terminal device 100.

Specifically, in the example illustrated in FIG. 7, after the terminal device 100 has approached the reference point Pa11, the measurement points Pb11, Pb12, and Pb13 are set in this order in chronological order in association with the movement of the terminal device 100. After the measurement point Pb13 has been set, the terminal device 100 approaches the reference point Pa12, and thereafter, the measurement points Pb14 and Pb15 are set in this order in chronological order in association with the movement of the terminal device 100.

On the premise as described above, for example, absolute coordinates at the measurement point Pb11, that is, the absolute position of the terminal device 100 positioned at the measurement point Pb11 is derived. In this case, the reference point that the terminal device 100 has approached at a time point closer to a time point at which the measurement point Pb11 has been set is the reference point Pa11. That is, for the derivation of the absolute coordinates of the measurement point Pb11, the information relating to the absolute position and posture of the terminal device 100 estimated at the reference point Pa11 is used.

As another example, absolute coordinates of the measurement point Pb14, that is, the absolute position of the terminal device 100 positioned at the measurement point Pb14 is derived. In this case, the reference point that the terminal device 100 has approached at a time point closer to a time point at which the measurement point Pb14 has been set is the reference point Pa12. That is, for the derivation of the absolute coordinates of the measurement point Pb14, the information relating to the absolute position and posture of the terminal device 100 estimated at the reference point Pa12 is used.

Note that a chronological relation between the measurement point as the derivation target of the absolute coordinates and the reference point whose information is used to derive the absolute coordinates is not particularly limited as long as it falls in a range of limitation by the time point at which the absolute coordinates are derived.

As one specific example, when, after information on a series of measurement points has been obtained, the absolute coordinates are derived for a part of the measurement points afterward, information at the reference point that the terminal device 100 has approached at another time point after the time point at which the measurement point has been set may be used.

Meanwhile, when the absolute coordinates for the measurement point is derived in real time with the setting of the measurement point, the information at the reference point that the terminal device 100 has approached at another time point immediately before the time point at which the measurement point has been set may be used.

Note that the examples described with reference to FIG. 4 to FIG. 7 are merely examples, and do not limit the content of the process relating to the estimation of the absolute position of the predetermined housing in the embodiment. That is, based on the absolute position and posture of the housing of the terminal device 100 at the reference point and the relative position of the housing at the respective measurement points, a part of the process relating to the estimation may be changed as appropriate as long as it falls within a range that does not depart from the idea of estimating the absolute position of the housing at the measurement point.

For example, as long as the absolute position and posture of the housing of the terminal device 100 at the reference point can be estimated, the method is not particularly limited.

As one specific example, when the terminal device 100 can receive the wireless signal relating to the positioning transmitted from the satellite at the reference point, the absolute position and posture of the terminal device 100 at the reference point may be estimated based on the technique, such as the GNSS. Note that in this case, the position in the real space where the wireless signal relating to the positioning transmitted from the satellite is receivable is set as the reference point.

As another example, images of the terminal device 100 positioned at the reference point are taken by a plurality of imaging devices from mutually different directions, and based on images corresponding to the imaging results, the absolute position and posture of the terminal device 100 may be estimated. Note that in this case, the position in the real space taken by the plurality of imaging devices is set as the reference point.

As long as the relative position of the terminal device 100 at the respective measurement points (that is, the position in the local coordinate system) can be estimated, the method is not particularly limited.

As one specific example, as described above, the feature points of the photographic subject are extracted from the images sequentially obtained according to the imaging results by the image capturing unit supported by the housing of the terminal device 100, and with the photographic subject as a reference based on the feature points, the changes in relative position of the housing may be calculated.

As another example, by using, for example, an acceleration sensor and an angular rate sensor, the acceleration rate and the angular speed that act on the housing of the terminal device 100 may be detected, and based on the detection result, the changes in relative position of the housing may be detected.

The description above has been given of a case where the absolute position of the housing of the terminal device 100 is three-dimensionally estimated. Meanwhile, the absolute position of the housing of the terminal device 100 can also be two-dimensionally estimated without considering the position in the vertical direction. In this case, it is only necessary to perform an operation by assigning 0 to rAlt, ry, and yi as components in the vertical direction in the conversion formulae shown as (Formula 3) to (Formula 5).

<Function Composition>

With reference to FIG. 8, one example of a function composition of the terminal device 100 according to the embodiment will be described focusing especially on the process relating to the estimation of the absolute position of the predetermined housing. Note that in the example illustrated in FIG. 8, as described with reference to FIG. 4 to FIG. 7, the terminal device 100 estimates its own absolute position and posture when it approaches the reference point 190 based on the information obtained from the reference point 190 as a result of approaching the reference point 190.

The terminal device 100 includes a communication unit 101, a detection unit 102, a posture evaluation unit 103, and an estimation unit 104. The terminal device 100 may include a storage unit 150.

The communication unit 101 detects approach of the reference point 190 and establishes contactless communication with the reference point 190, thus obtaining various kinds of information from the reference point 190 through the contactless communication. As one specific example, the communication unit 101 may obtain information relating to the absolute position and posture of the reference point 190 from the reference point 190 with which the contactless communication is established. Note that the communication device applied as the communication unit 101 may be changed as appropriate according to the communication method applied to the contactless communication with the reference point 190.

The communication unit 101 may obtain the information through the contactless communication from the reference point 190 detecting the approach according to an instruction from the posture evaluation unit 103 described later. This ensures controlling the communication unit 101 to obtain the information from the reference point 190 based on the contactless communication, for example, in a state where the housing of the terminal device 100 is in a relatively predetermined posture and is close to the reference point 190.

The communication unit 101 then outputs the information obtained from the reference point 190 to the estimation unit 104 described later.

Note that the communication unit 101 corresponds to one example of a "first obtainer." That is, the information relating to the absolute position and posture of the reference point 190 that the communication unit 101 obtains from the reference point 190 corresponds to one example of "first information."

The detection unit 102 detects the changes in relative position of the housing of the terminal device 100. The detection unit 102 may detect the changes in relative posture of the housing of the terminal device 100.

As one specific example, by extracting the feature points of the object and the background captured as a photographic subject in the captured image, the detection unit 102 may recognize the photographic subject and calculate the changes in relative position of the housing with the photographic subject as a reference. On this occasion, the detection unit 102 may calculate the changes in relative posture of the housing with the photographic subject as a reference. Note that in this case, the detection unit 102 may be achieved by an imaging device, such as what is called a digital camera.

As another example, the detection unit 102 may detect the acceleration rate acting on the housing of the terminal device 100, and based on the detection result, may calculate the changes in relative position of the housing. On this occasion, the detection unit 102 may detect the angular speed acting on the housing of the terminal device 100, and based on the detection result, may calculate the changes in relative posture of the housing. Note that in this case, the detection unit 102 may be achieved by various kinds of sensors, such as an acceleration sensor and an angular rate sensor.

The description above is obviously only one example, and as long as the changes in relative position and posture of the housing of the terminal device 100 can be detected, the method is not particularly limited, and a device for achieving the detection unit 102 may be changed as appropriate according to the method.

The detection unit 102 then sequentially outputs at least the information corresponding to the detection result of the changes in relative position of the housing of the terminal device 100 to the estimation unit 104 described later. On this occasion, the detection unit 102 may output the detection result of the changes in relative posture of the housing of the terminal device 100 to the estimation unit 104.

Note that the detection unit 102 corresponds to one example of a "second obtainer." That is, the information corresponding to the detection result of the changes in relative position of the housing of the terminal device 100 by the detection unit 102 corresponds to one example of "second information."

The posture evaluation unit 103 evaluates whether the posture of the housing of the terminal device 100 is a predetermined posture or not, and according to the evaluation result, performs a predetermined notification to the communication unit 101. As one specific example, the posture evaluation unit 103, when the communication unit 101 detects the approach of the reference point 190, may evaluate whether the housing of the terminal device 100 is in a relatively predetermined posture with respect to the reference point 190 or not. In this case, when the posture evaluation unit 103 evaluates the housing of the terminal device 100 as being in the relatively predetermined posture with respect to the reference point 190, the posture evaluation unit 103 may instruct the communication unit 101 to obtain information from the reference point 190.

Note that as long as the posture evaluation unit 103 can evaluate whether the housing of the terminal device 100 is in the relatively predetermined posture with respect to the reference point 190 or not, the method is not particularly limited.

As one specific example, when the posture evaluation unit 103 detects the gravitational acceleration rate acting on the housing of the terminal device 100 and the direction of the gravitational acceleration rate approximately corresponds to a predetermined relative direction to the housing (e.g., the Y-direction), the posture evaluation unit 103 may evaluate the housing as being in the relatively predetermined posture with respect to the reference point 190.

As another example, the posture evaluation unit 103 may evaluate the housing as being in the relatively predetermined posture with respect to the reference point 190 by using the detection result of the approach of the reference point 190 to the housing by a proximity sensor (not illustrated) supported by the housing of the terminal device 100. Note that in this case, it is preferred that the proximity sensor and an antenna for the communication unit 101 to perform the contactless communication are supported by the housing of the terminal device 100 such that the communication unit 101 can establish the contactless communication with the reference point 190, for example, when the above-described proximity sensor detects the approach of the reference point 190.

The posture evaluation unit 103 may monitor the detection result of the motion of the housing by the acceleration sensor (not illustrated) supported by the housing of the terminal device 100, and when a variation of the detection result falls within a predetermined range, may instruct the communication unit 101 to obtain the information from the reference point 190. The application of such control ensures controlling such that the estimation of the absolute position and posture of the housing is performed in a state where the housing of the terminal device 100 is stationary in the relatively predetermined posture with respect to the reference point 190 (that is, in a state where the posture is maintained).

Not only the control of a side of the terminal device 100 but also a mechanism with which the terminal device 100 approaches the reference point 190 in the state of being in the relatively predetermined posture may be provided as a configuration (e.g., constructive features) of a side of the reference point 190.

As one specific example, a supporting member that supports the housing of the terminal device 100 approaching the reference point 190 so as to be in the predetermined posture may be provided on the side of the reference point 190. Such a configuration ensures controlling the posture of the terminal device 100 approaching the reference point 190 to satisfy predetermined conditions.

As another example, the reference point 190 may be configured to include a plurality of the communication surfaces disposed to be arranged side by side along a predetermined direction as a communication surface (in other words, a surface to detect the approach of the housing of the terminal device 100) for performing the contactless communication. Based on that, the posture evaluation unit 103 may evaluate the posture of the housing of the terminal device 100 based on the information sequentially obtained from the reference point 190 as a result of the terminal device 100 sequentially approaching the plurality of communication surfaces of the above-described reference point 190 within a predetermined period. Such a configuration ensures controlling the posture of the terminal device 100 approaching the reference point 190 to satisfy the predetermined conditions since the terminal device 100 is caused to slide along the predetermined direction when the terminal device 100 approaches the reference point 190.

Note that when the mechanism with which the terminal device 100 approaches the reference point 190 in the state of being in the relatively predetermined posture is provided by the configuration of the reference point 190 side as described above, the posture evaluation unit 103 does not necessarily have to be provided. It is also obviously possible to use the mechanism by the configuration of the reference point 190 side described above and the evaluation by the posture evaluation unit 103 in combination.

The estimation unit 104 sequentially obtains at least the information corresponding to the detection result of the changes in relative position of the housing of the terminal device 100 from the detection unit 102. The estimation unit 104 chronologically monitors the changes in relative position of the housing of the terminal device 100 based on the information sequentially output from the detection unit 102 to estimate the position of the housing in the local coordinate system.

The estimation unit 104 may manage the information corresponding to the estimation result of the position of the above-described housing in the local coordinate system for each detection time point (in other words, for each measurement point) by the detection unit 102 by storing it in a predetermined storage area (e.g., the storage unit 150).

The estimation unit 104 estimates the absolute position and posture of the housing of the terminal device 100 close to the reference point 190 based on the information obtained from the reference point 190 when the communication unit 101 detects the approach of the reference point 190. The estimation unit 104 then converts the relative position of the housing at the respective measurement points (the position in the local coordinate system) according to the detection result by the detection unit 102 into the absolute position (the position in the absolute coordinate system) by using the estimation result of the absolute position and posture of the housing. Note that the detailed description for the same process is omitted as it has been described above with reference to FIG. 4 to FIG. 7.

The estimation unit 104 may manage the information according to the estimation result of the absolute position and posture of the housing of the terminal device 100 based on the information obtained from the reference point 190 by storing it in the predetermined storage area (e.g., the storage unit 150). Similarly, the estimation unit 104 may manage the information relating to the absolute position of the housing of the terminal device 100 derived for the respective measurement points by storing it in the predetermined storage area (e.g., the storage unit 150).

The storage unit 150 is a storage area that stores data and programs for each unit in the terminal device 100 to execute the process. The storage unit 150 may store information and data generated by each unit in the terminal device 100. Note that the storage unit 150 may be achieved by, for example, a storage device built in the terminal device 100. As another example, the storage unit 150 may be achieved by an external storage device different from the terminal device 100. Specifically, the storage unit 150 may be achieved by a storage device externally attached to the terminal device 100 or may be achieved by a storage device coupled to the terminal device 100 via a network.

Note that the configuration illustrated in FIG. 8 is merely one example, and does not limit the configuration of the device for achieving the technical features according to the embodiment. For example, at least a part of functions of the terminal device 100 may be achieved by a plurality of devices collaborating.

As one specific example, a part of the functions of the terminal device 100 may be achieved by another device different from the terminal device 100. As one more specific example, the communication unit 101, the detection unit 102, the posture evaluation unit 103, and the estimation unit 104 may be provided in the devices different from one another. Note that in this case, at least the communication unit 101 and the detection unit 102 are preferred to be provided on a side of the device as an estimation target of the position and posture of the housing. The device in which the estimation unit 104 is provided corresponds to one example of an "information processing device" according to the embodiment.

As another example, a process load relating to the achievement of at least a part of the functions of the terminal device may be dispersed to a plurality of devices. As one more specific example, the process load of the estimation unit 104 may be dispersed to the plurality of devices.

According to the estimating method of the absolute position and posture of the predetermined housing at the reference point (e.g., the housing of the terminal device 100) and the detecting method of the changes in relative position of the predetermined housing at the measurement point, at least a part of functions among a series of functions of the terminal device 100 may be changed.

As one specific example, based on the technique, such as the GNSS, when the absolute position and posture of the terminal device 100 at the reference point is estimated, instead of the communication unit 101, a configuration member for receiving the wireless signal transmitted from the satellite may be provided. Note that in this case, any position can be a reference point as long as the wireless signal can be received from the satellite. Therefore, the reference point does not necessarily have to be set in a secured manner.

According to the detecting method of the changes in relative position of the predetermined housing, instead of the detection unit 102, another configuration member may be provided.

Process

With reference to FIG. 9, one example of a process of the terminal device 100 according to the embodiment will be described focusing especially on the process according to the estimation of the absolute position of the predetermined housing. Note that in the example illustrated in FIG. 9, as described with reference to FIG. 4 to FIG. 7, based on the information obtained from the reference point 190 as a result of approaching the reference point 190, the terminal device 100 estimates its own absolute position and posture when approaching the reference point 190.

At S101, the terminal device 100 determines whether approach to the reference point 190 is detected or not. The terminal device 100 proceeds with the process to S102 when it is determined that the approach to the reference point 190 is detected at S101.

At S102, the terminal device 100 obtains information relating to the absolute position and posture of the reference point 190 from the approached reference point 190, and based on the information, estimates the absolute position and posture of its own housing. Note that the detailed description for the process relating to the same estimation is omitted as it has been described above with reference to FIG. 4 to FIG. 6.

Meanwhile, the terminal device 100 proceeds with the process to S103 when it is determined that the approach to the reference point 190 is not detected at S101. In this case, the process at S102 is not executed.

At S103, the terminal device 100 detects the changes in relative position of its own housing and chronologically monitors the detection result, and thus, estimates the position of the housing in the local coordinate system. This ensures the estimation of the position of the housing of the terminal device 100 in the local coordinate system for each time point of the above-described detection (in other words, for each measurement point).

At S104, the terminal device 100 determines whether the information relating to the absolute position and posture of the reference point 190 has already been obtained from the reference point 190 or not. When it is determined that the information relating to the absolute position and posture of the reference point 190 has already been obtained from the reference point 190 at S104, the terminal device 100 proceeds with the process to S105. Note that when the information has already been obtained from the reference point 190, at S102, the absolute position and posture of the housing of the terminal device 100 has been estimated at the time point at which the terminal device 100 has approached the reference point 190.

At S105, the terminal device 100 converts the position of the housing in the local coordinate system estimated for the measurement point at S103 into a position in the absolute coordinate system based on the estimation result of the absolute position and posture of its own housing estimated at S102. This ensures estimating the absolute position of the housing of the terminal device 100 at the respective measurement points.

Meanwhile, when it is determined that the information relating to the absolute position and posture of the reference point 190 has not been obtained from the reference point 190 at S104, the terminal device 100 terminates a series of process illustrated in FIG. 9.

The terminal device 100 executes the series of process illustrated in FIG. 9 at a desired timing. As one specific example, the terminal device 100 may periodically execute the series of process illustrated in FIG. 9 for each predetermined time point. As another example, the terminal device 100 may execute the series of process illustrated in FIG. 9 based on a predetermined trigger.

Application Example

Figure 10:
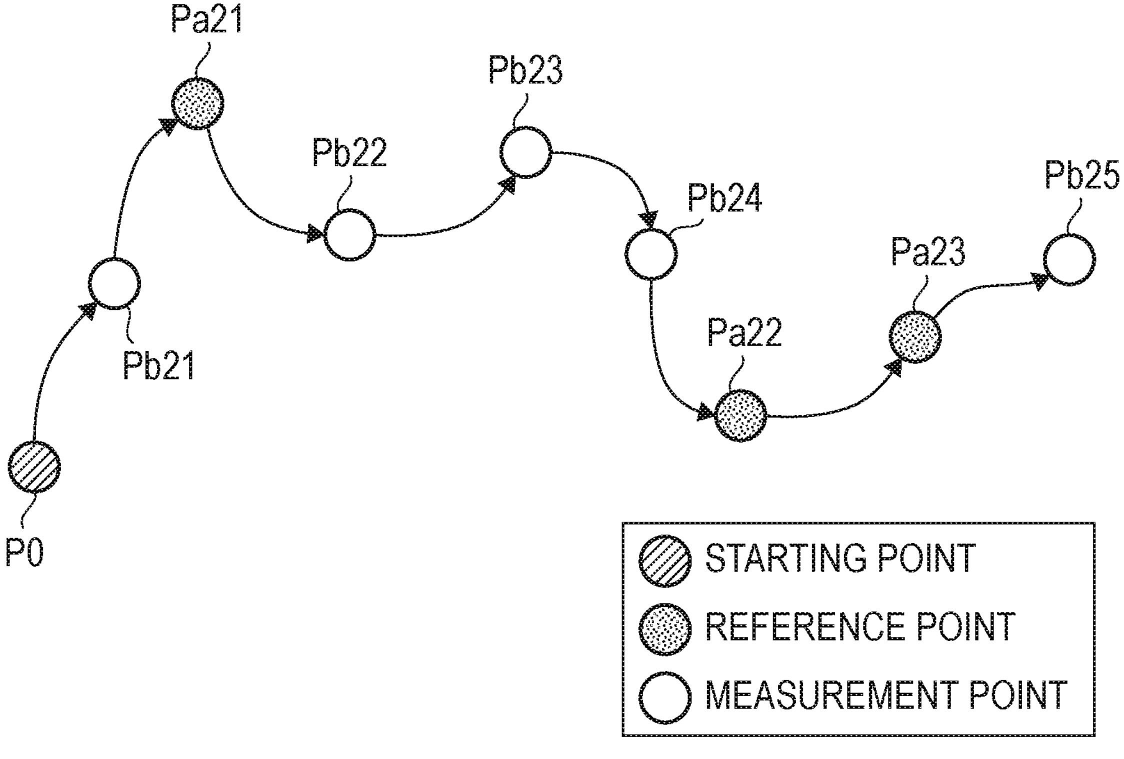
FIG. 10 is an explanatory view regarding an application example of a technique according to the embodiment.

With reference to FIG. 10, an application example of a technique according to the embodiment will be described. In the example illustrated in FIG. 10, with the terminal device 100 according to the embodiment being a smartphone held by a user, a case where positioning of the smartphone is performed will be described.

A starting point P0 illustrated in FIG. 10 schematically indicates the position of the terminal device 100 at a time point at which the positioning of the terminal device 100 (the smartphone) is started. As one specific example, when the user activates an application for achieving the positioning of the terminal device 100 installed in the terminal device 100, the terminal device 100 sets the position of its own housing at a time point of the application activation as the starting point P0.

Next, assume that the user starts to move in a state of holding the terminal device 100 and causes the terminal device 100 to approach each of reference points Pa21, Pa22, and Pa23 disposed on a path during the movement in this order.

Each of Pb21 to Pb25 indicates a measurement point. Specifically, the estimation of the relative position of the terminal device 100 is performed at least once on the path while the user moves from the starting point P0 to the reference point Pa21 in the state of holding the terminal device 100, and the measurement point Pb21 is set to match the time point at which the estimation is performed. Similarly, the measurement points Pb22, Pb23, and Pb24 are set on the path between the reference point Pa21 and the reference point Pa22. The measurement point is not set on the path between the reference point Pa22 and the reference point Pa23, and the measurement point Pb25 is set on the path after the reference point Pa23.

On the premise as described above, when the absolute position of its own housing at the respective measurement points is estimated, the terminal device 100 determines the reference point as an application target of the information for the estimation according to whether the estimation is performed in real time or the estimation is performed afterward.

Specifically, when the absolute position of its own housing at the respective measurement points is estimated in real time, the terminal device 100 controls the reference point as a source of the information used for the estimation to a reference point at which the approach has been performed before the time point at which the target measurement point has been set.

In this case, for example, when the absolute position of its own housing at the measurement point Pb24 is estimated, the terminal device 100 uses only the reference point Pa21 at which the approach has been performed before the time point at which the measurement point Pb24 has been set as a source candidate of the information used for the estimation. Based on that, the terminal device 100 uses the information obtained from the reference point at which the approach has been performed at a time point closer to the time point at which the measurement point Pb24 has been set among the reference points set as the candidates for the estimation of the absolute position of its own housing at the measurement point Pb24. That is, in this case, the information obtained from the reference point Pa21 is to be used for the estimation of the absolute position of the housing of the terminal device 100.

In contrast to this, when the absolute position of its own housing at the respective measurement points is estimated afterward, the terminal device 100 does not control the reference point as the source of the information used for the estimation, but specifies a series of reference points to which the approach has been performed as the candidates.

In this case, for example, the terminal device 100, also when the absolute position of its own housing at the measurement point Pb24 is estimated, specifies the reference points Pa21, Pa22, and Pa23 to which the approach has been performed as the candidates of the source of the information used for the estimation. Based on that, among the reference points set as the candidates, the terminal device 100 uses the information obtained from the reference point to which the approach has been performed at a time point closer to the time point at which the measurement point Pb24 has been set for the estimation of the absolute position of its own housing at the measurement point Pb24. That is, in this case, the information obtained from the reference point Pa22 is used for the estimation of the absolute position of the housing of the terminal device 100.

Note that at the time point at which the estimation of the absolute position of the housing of the terminal device 100 is performed, a situation where no approach has been performed to any reference points is also conceivable. In such a case, the terminal device 100 may terminate the process relating to the estimation as non-positionable.

Conclusion

As described above, the information processing device (e.g., the terminal device 100) according to the embodiment includes the first obtainer, the second obtainer, and an estimator. The first obtainer obtains the first information relating to the absolute position and posture in the real space of the predetermined housing (e.g., the housing of the terminal device 100). The second obtainer sequentially obtains the second information corresponding to the changes in relative position of the above-described housing in chronological order. The estimator estimates the absolute position in the real space of the housing at the time point at which the changes in relative position of the above-described housing indicated by the above-described second information have been detected with the absolute position and posture of the above-described housing corresponding to the above-described first information as a reference.

With the configuration as described above, the information processing device according to the embodiment ensures estimating the absolute position of the housing even under a situation where it is difficult to maintain a state where the wireless signal from the satellite relating to the positioning is regularly receivable, like in an environment of being covered with a shield, such as a roof and a wall surface (e.g., in indoors and in underground facilities).

REFERENCE SIGNS LIST

100 Terminal device
101 Communication unit
102 Detection unit
103 Posture evaluation unit
104 Estimation unit
150 Storage unit

The invention claimed is:

1. An information processing device comprising:

a first obtainer configured to obtain first information relating to an absolute position and posture in a real space of a housing;

a second obtainer configured to sequentially obtain second information corresponding to a change in relative position of the housing in chronological order; and an estimator configured to estimate the absolute position in the real space of the housing at a time point at which the change in relative position of the housing indicated by the second information has been detected with the absolute position and posture of the housing corresponding to the first information as a reference;

wherein:

the first information is calculated based on information relating to an absolute position and posture in a real space of a reference point, the information being obtained from the reference point as a result of the housing approaching the reference point disposed in the real space, the reference point is disposed such that a surface configured to detect the approach of the housing extends along a vertical direction, the first information is obtained with a relative posture of the housing with respect to the reference point satisfying a predetermined condition, the first obtainer is configured to evaluate whether a posture of the housing approaching the reference point satisfies the predetermined condition or not, and obtain the first information according to the evaluation result, the reference point has a plurality of the surfaces arranged side by side and configured to detect the approach of the housing, and the first obtainer is configured to evaluate whether the posture of the housing approaching the reference point satisfies the predetermined condition or not, based on information obtained as a result of the housing approaching each of the plurality of surfaces within a predetermined period.

2. The information processing device according to claim 1, wherein the information relating to the absolute position and posture in the real space of the reference point is obtained from the reference point based on contactless communication between the housing and the reference point.

3. The information processing device according to claim 1, wherein the first obtainer is configured to evaluate whether the posture of the housing approaching the reference point satisfies the predetermined condition or not, based on a detection result by a detector configured to detect the approach of the housing with respect to the surface.

4. The information processing device according to claim 1, wherein the first obtainer is configured to obtain the first information when a variation of the changes in relative posture of the housing approaching the reference point detected by a predetermined detector falls within a predetermined range.

5. The information processing device according to claim 1, wherein the estimator is configured to estimate an absolute position in the real space of the housing at a time point at which the change in relative position of the housing indicated by the second information has been detected based on the second information and the first information obtained at a time point closer to the time point.

6. An information processing method executed by an information processing device, the method comprising:

a first obtaining step of obtaining first information relating to an absolute position and posture in a real space of a housing;

a second obtaining step of sequentially obtaining second information corresponding to a change in relative position of the housing in chronological order; and an estimating step of estimating an absolute position in the real space of the housing at a time point at which the change in relative position of the housing indicated by the second information has been detected with the absolute position and posture of the housing corresponding to the first information as a reference;

wherein:

the first information is calculated based on information relating to an absolute position and posture in a real space of a reference point, the information being obtained from the reference point as a result of the housing approaching the reference point disposed in the real space, the reference point is disposed such that a surface configured to detect the approach of the housing extends along a vertical direction, the first information is obtained with a relative posture of the housing with respect to the reference point satisfying a predetermined condition, the first obtaining step further configured for evaluating whether a posture of the housing approaching the reference point satisfies the predetermined condition or not, and obtain the first information according to the evaluation result, the reference point has a plurality of the surfaces arranged side by side and configured to detect the approach of the housing, and the first obtaining step further configured for evaluating whether the posture of the housing approaching the reference point satisfies the predetermined condition or not, based on information obtained as a result of the housing approaching each of the plurality of surfaces within a predetermined period.

7. A non-transitory computer readable medium storing computer executable instructions for causing a computer to execute:

a first obtaining step of obtaining first information relating to an absolute position and posture in a real space of a housing;

a second obtaining step of sequentially obtaining second information corresponding to a change in relative position of the housing in chronological order; and an estimating step of estimating an absolute position in the real space of the housing at a time point at which the change in relative position of the housing indicated by the second information has been detected with the absolute position and posture of the housing corresponding to the first information as a reference;

wherein:

the first information is calculated based on information relating to an absolute position and posture in a real space of a reference point, the information being obtained from the reference point as a result of the housing approaching the reference point disposed in the real space, the reference point is disposed such that a surface configured to detect the approach of the housing extends along a vertical direction, the first information is obtained with a relative posture of the housing with respect to the reference point satisfying a predetermined condition, the first obtaining step further configured for evaluating whether a posture of the housing approaching the reference point satisfies the predetermined condition or not, and obtain the first information according to the evaluation result, the reference point has a plurality of the surfaces arranged side by side and configured to detect the approach of the housing, and the first obtaining step further configured for evaluating whether the posture of the housing approaching the reference point satisfies the predetermined condition or not, based on information obtained as a result of the housing approaching each of the plurality of surfaces within a predetermined period.

* * * * *